(12) United States Patent
Stephenson et al.

(10) Patent No.: US 8,204,029 B2
(45) Date of Patent: Jun. 19, 2012

(54) MOBILE INTELLIGENT ROAMING USING MULTI-MODAL ACCESS POINT DEVICES

(75) Inventors: David Sheldon Stephenson, San Jose, CA (US); Seema Nayak, Cupertino, CA (US); Sudip Ghosal, Cupertino, CA (US); Rajneesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 12/339,473

(22) Filed: Dec. 19, 2008

(65) Prior Publication Data

US 2010/0118830 A1    May 13, 2010

Related U.S. Application Data

(60) Provisional application No. 61/112,862, filed on Nov. 10, 2008.

(51) Int. Cl.
*H04W 4/00* (2009.01)

(52) U.S. Cl. ...... 370/338; 370/332; 370/333; 488/422.1; 488/432.1; 488/439; 488/440; 488/444; 488/446; 709/220

(58) Field of Classification Search .......... None
See application file for complete search history.

(56) References Cited

U.S. PATENT DOCUMENTS

| | | | |
|---|---|---|---|
| 4,613,990 A * | 9/1986 | Halpern | 455/522 |
| 5,396,541 A * | 3/1995 | Farwell et al. | 455/403 |
| 5,479,409 A * | 12/1995 | Dupuy et al. | 370/337 |
| 5,649,000 A * | 7/1997 | Lee et al. | 455/436 |
| 6,185,695 B1 * | 2/2001 | Murphy et al. | 714/4.11 |
| 6,263,204 B1 * | 7/2001 | Kusaki et al. | 455/439 |
| 6,332,077 B1 * | 12/2001 | Wu et al. | 455/432.1 |
| 6,408,172 B1 * | 6/2002 | Alperovich et al. | 455/404.1 |

(Continued)

FOREIGN PATENT DOCUMENTS

DE    102006018920 A1    10/2007

(Continued)

OTHER PUBLICATIONS

International Search Report and Written Opinion dated Feb. 5, 2010 cited in PCT/US2009/057237.

*Primary Examiner* — Warner Wong
*Assistant Examiner* — Dung B Huynh
(74) *Attorney, Agent, or Firm* — Edell, Shapiro & Finnan, LLC

(57) ABSTRACT

A system and method are provided in which access point (AP) devices in a wireless local area network (WLAN) are typed or configured into one of three measurement and reporting roles: Monitor-Mode AP (MMAP), Portal AP (PAP), a Border AP (BAP) or an Interior AP (IAP). APs are assigned specific link measurement requirements according to their assigned type or role. In general, MMAPs and PAPs have the greatest measurement and reporting responsibilities, BAPs have less measurement and reporting responsibilities than PAPs and IAPs have the least measurement and reporting responsibilities. The APs generate measurements that are supplied to appropriate equipment to facilitate handover decisions with respect to a dual-mode wireless client device that roams between the WLAN and another network or vice versa. As a result, link measurements are only performed by APs in locations where such measurements are necessary for handover service, thus reducing the overall processing load on the WLAN infrastructure.

33 Claims, 6 Drawing Sheets

U.S. PATENT DOCUMENTS

| | | | |
|---|---|---|---|
| 6,674,713 B1 * | 1/2004 | Berg et al. | 370/217 |
| 6,810,252 B1 * | 10/2004 | Kwon | 455/436 |
| 7,110,760 B1 * | 9/2006 | Busropan | 455/432.1 |
| 7,308,263 B2 * | 12/2007 | Gallagher et al. | 455/439 |
| 7,353,028 B2 * | 4/2008 | Fukuhara | 455/436 |
| 7,489,930 B2 * | 2/2009 | Aerrabotu et al. | 455/439 |
| 7,623,873 B2 * | 11/2009 | Satrusajang et al. | 455/456.1 |
| 7,624,267 B2 * | 11/2009 | Huang et al. | 713/168 |
| 7,660,278 B2 * | 2/2010 | Qi et al. | 370/328 |
| 7,738,876 B1 * | 6/2010 | Radhakrishnan et al. | 455/450 |
| 7,983,220 B2 * | 7/2011 | Kurita et al. | 370/331 |
| 2001/0054046 A1 * | 12/2001 | Mikhailov et al. | 707/500 |
| 2003/0002446 A1 * | 1/2003 | Komaili et al. | 370/252 |
| 2003/0091006 A1 * | 5/2003 | Peltola | 370/332 |
| 2003/0104831 A1 * | 6/2003 | Razavilar et al. | 455/522 |
| 2003/0142651 A1 * | 7/2003 | Matta et al. | 370/338 |
| 2004/0063455 A1 * | 4/2004 | Eran et al. | 455/525 |
| 2004/0170191 A1 * | 9/2004 | Guo et al. | 370/468 |
| 2004/0224690 A1 * | 11/2004 | Choi et al. | 455/436 |
| 2005/0074016 A1 * | 4/2005 | Dekeyser | 370/401 |
| 2005/0078626 A1 * | 4/2005 | Ogino et al. | 370/328 |
| 2005/0213579 A1 * | 9/2005 | Iyer et al. | 370/395.2 |
| 2006/0019663 A1 * | 1/2006 | Cuffaro et al. | 455/436 |
| 2006/0045056 A1 * | 3/2006 | O'Hara | 370/338 |
| 2006/0111112 A1 * | 5/2006 | Maveddat | 455/439 |
| 2006/0178147 A1 | 8/2006 | Jagadeesan et al. | |
| 2006/0189317 A1 * | 8/2006 | Nakano | 455/436 |
| 2006/0218606 A1 * | 9/2006 | Jung et al. | 725/95 |
| 2006/0245395 A1 * | 11/2006 | Jain et al. | 370/331 |
| 2007/0047492 A1 * | 3/2007 | Kim et al. | 370/331 |
| 2007/0140184 A1 * | 6/2007 | Garg et al. | 370/338 |
| 2007/0249291 A1 * | 10/2007 | Nanda et al. | 455/73 |
| 2007/0283002 A1 * | 12/2007 | Bornhoevd et al. | 709/224 |
| 2008/0107090 A1 * | 5/2008 | Thomson et al. | 370/338 |
| 2008/0130579 A1 * | 6/2008 | Kurita et al. | 370/331 |
| 2008/0130596 A1 * | 6/2008 | Kalhan | 370/338 |
| 2008/0151843 A1 * | 6/2008 | Valmikam et al. | 370/338 |
| 2008/0181179 A1 * | 7/2008 | Karaoguz | 370/331 |
| 2008/0182579 A1 * | 7/2008 | Wang et al. | 455/436 |
| 2008/0212542 A1 * | 9/2008 | Kung et al. | 370/336 |
| 2008/0253314 A1 | 10/2008 | Stephenson et al. | |
| 2009/0129291 A1 * | 5/2009 | Gupta et al. | 370/254 |
| 2009/0135784 A1 * | 5/2009 | Horn et al. | 370/331 |
| 2009/0190553 A1 * | 7/2009 | Masuda et al. | 370/331 |
| 2010/0091669 A1 * | 4/2010 | Liu et al. | 370/252 |
| 2010/0091745 A1 * | 4/2010 | Bevan et al. | 370/338 |

FOREIGN PATENT DOCUMENTS

| | | |
|---|---|---|
| EP | 1667358 A1 | 6/2006 |
| WO | 2008/066929 A2 | 6/2008 |

* cited by examiner

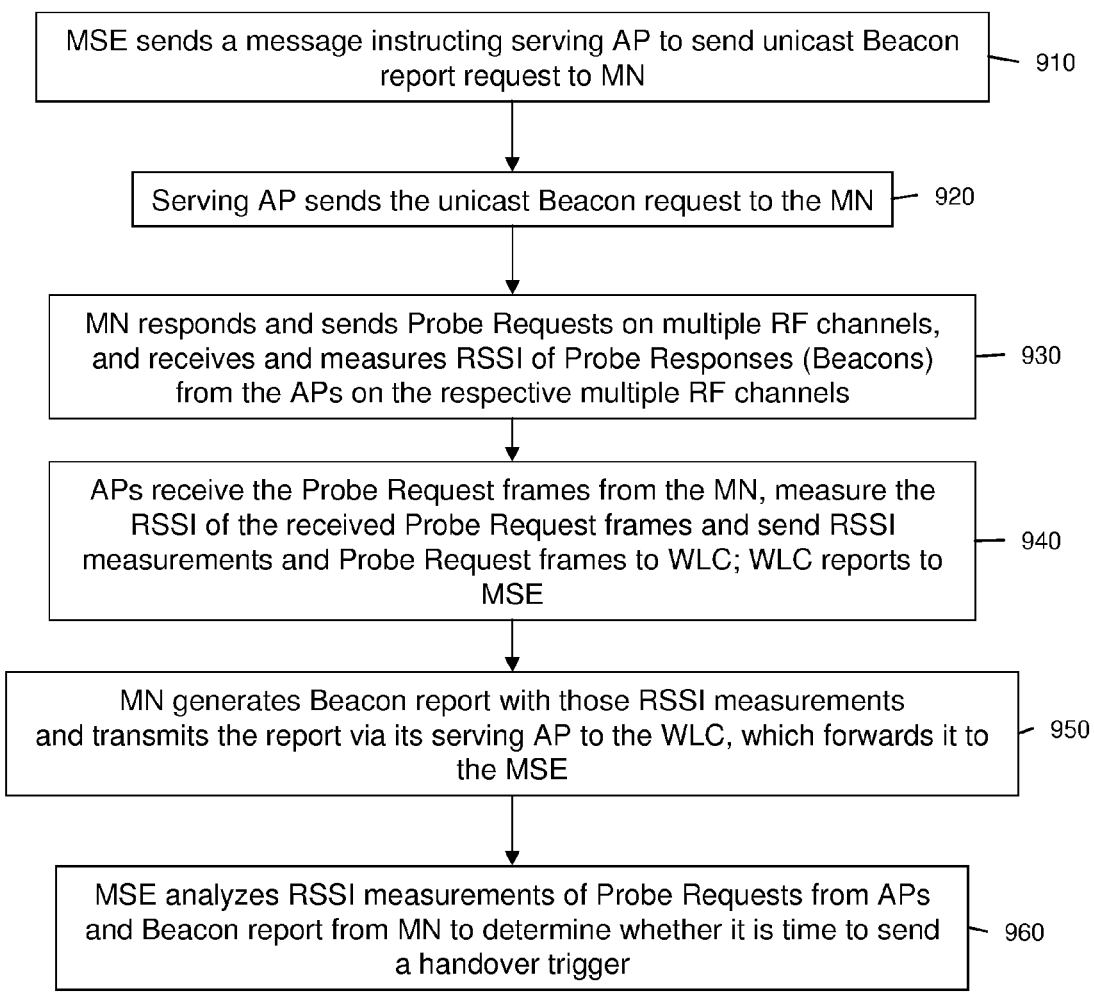

MOBILE INTELLIGENT ROAMING USING MULTI-MODAL ACCESS POINT DEVICES

CROSS REFERENCE TO RELATED APPLICATION

This application claims priority to U.S. Provisional Application No. 61/112,862, filed Nov. 10, 2008, the entirety of which is incorporated herein by reference.

TECHNICAL FIELD

The present disclosure relates to wireless communication systems, and more particularly to systems in which a mobile wireless communication device can roam between two different types of wireless networks or between two networks (of the same technology) which are administratively controlled by different entities.

BACKGROUND

Wireless communication technologies have rapidly developed over the last several years to the point where a mobile device, such as a mobile cellular telephone or a multi-function mobile wireless device (capable of email, internet browsing, voice calls, etc.), has the capability to operate in multiple wireless networks. For example, such a multi-mode device may be capable of operating in a wireless local area network (WLAN), such as a WiFi™ network and also with a wide area wireless network, such as a cellular network. For simplicity, a multi-mode or dual-mode wireless client device is referred to herein as a mobile node (MN). The MN may employ voice-over-internet protocol (VoIP) techniques when conducting a voice call via the WiFi network and more traditional circuit switching techniques when conducting a voice call via the cellular network. Consequently, the MN needs to reliably roam between the two different networks. This is particularly important when a user is in the middle of a voice call.

There are other applications where it may be desirable to handover VoIP service on a WiFi network to VoIP service on the cellular network. Further still, there are applications where it may be desirable to handover a data (non-voice call) communication session for a data application where continuity is beneficial. In all of these cases, a handover trigger generation by the WLAN infrastructure is useful.

WLAN infrastructure provides triggers to the MN or to a network component informing it when, upon entering a building, robust wireless VoIP service is available and when upon leaving the building, robust wireless VoIP service can no longer be provided. Handover triggers are provided by network infrastructure; user-based policies, network-based policies and network conditions (both wired and wireless) can be applied to determine if and when to send handover triggers.

In order to determine when to send handover triggers, the WLAN infrastructure measures link parameters on the radio link between a WLAN access point (AP) and the MN or obtains these measurements from the MN. In WiFi networks, the MN determines the AP with which to associate. As the MN roams from AP to AP, the link conditions naturally change. When the appropriate link parameters cross a threshold, the WLAN infrastructure generates and sends a handover trigger. In general, a handover trigger can be a hand-out trigger advising the MN to roam to a cellular network or a hand-in trigger advising the MN that it may roam in to the WiFi network.

One of the requirements for a WLAN handover system is to provide handover triggers without adversely affecting the battery life of the MN. One criterion users place on mobile devices is standby time and talk time. If the WLAN handover system is such that the MN must transmit many extra frames or keep its receiver on for extended periods of time, then the MN's battery will discharge too rapidly and the user will have to frequently recharge the MN and risk losing service during a critical user activity, e.g., an important voice call.

Techniques are needed to provide better handover service to MNs.

BRIEF DESCRIPTION OF THE DRAWINGS

FIG. 6 is a flow chart showing a report request process that is useful to obtain additional measurements for handover trigger analysis.

DESCRIPTION OF EXAMPLE EMBODIMENTS

Overview

According to one aspect, a system and method are provided in which local mode APs in a WLAN infrastructure deployment are typed or configured into one of three measurement and reporting roles: a Portal AP (PAP), a Border AP (BAP) or an Interior AP (IAP). APs are assigned specific link measurement requirements according to their assigned type or role as described in more detail hereinafter. In general, PAPs have the greatest measurement and reporting responsibilities, BAPs have less measurement and reporting responsibilities than PAPs and IAPs have the least measurement and reporting responsibilities. The APs generate measurements that are supplied to appropriate equipment to facilitate handover decisions with respect to a MN that roams between the WLAN and another network or vice versa. As a result, link measurements are only performed by APs in locations where such measurements are necessary for handover service, thus reducing the overall processing load on the WLAN infrastructure. According to another aspect, one or more APs are configured to operate as a receive-only monitor AP, whereby the AP does not provide normal two-way communication service with mobile devices. An AP configured as a monitor mode AP (MMAP) makes measurements on multiple channels according to a channel scanning schedule and these measurements are used for handover decisions for a MN. Moreover, techniques are provided to keep track of a call state and location of a MN to conserve the MN's battery life.

The handover trigger may be a signal that is sent to the MN or a signal that is sent to a network component, such as to an internet protocol private branch exchange (IP PBX) or a mobility gateway. Moreover, it is generally considered more robust to send the handover trigger to the some network component rather than to the MN. For example, the MN may be leaving the enterprise when the handover (e.g., a hand-out) trigger needs to be sent. In this situation, if the MN leaves too quickly, communication between the entity that generates the handover trigger and the MN may be lost via the WLAN. However, communication via a wired LAN to an IP PBX/ mobile gateway is generally always possible (barring hardware failures).

Figure 1:
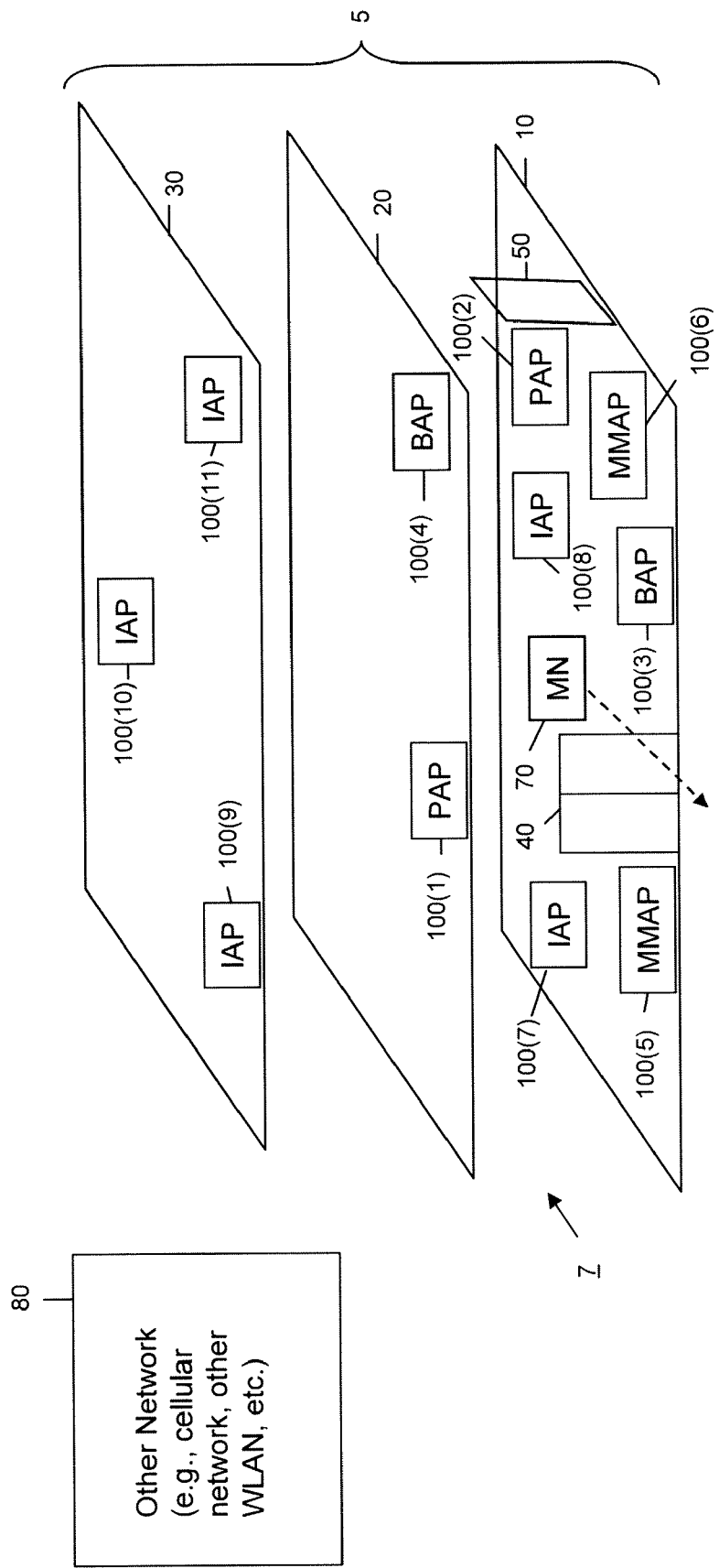
FIG. 1 is diagram of a building in which WLAN equipment is employed and showing a situation in which a communication session is to be handed over from the WLAN to another network.

Referring first to FIG. 1, an example of a building is shown at reference numeral 5. The building 5 has multiple floors, e.g., a bottom floor 10 and two upper floors 20 and 30. A WLAN 7 is deployed in the building 5 using a plurality of APs. The APs are assigned a measurement and reporting type or role as explained above. In this example, the building has two exits, one at the front identified by reference numeral 40 and one on the side shown at reference numeral 50. A MN is shown at reference numeral 70 and this MN 70 has dual-mode capability such that it can operate with a WLAN and also with another network. To this end, another network is shown at reference numeral 80, and as described above, this other network may be a cellular network or another WLAN. The MN 70 may conduct various wireless communication sessions for voice calls or other (data) services via the WLAN 7 or the other network 80. While a single MN is shown for simplicity in FIG. 1, it is understood that there are normally multiple MNs operating in the WLAN.

The PAPs, BAPs and IAPs are local mode APs in that they are configured to perform normal two-way communication with WLAN wireless client devices, allowing WLAN wireless client devices to associate with them, etc. Thus, the local mode APs may be serving communication between the MN 70 and the WLAN 7. By contrast, MMAPs do not perform two-way communication with wireless client devices. MMAPs operate in a receive mode in order to monitor transmissions made by wireless client devices on each of multiple RF channels; however, they may transmit frames to other APs for certain network-related administrative functions.

Each AP shown in FIG. 1 is assigned a measurement and reporting type/mode or role. For example, AP 100(1) is designated a PAP because it is closest in radio frequency (RF) proximity to the exit 40 of the building 5. The same applies to AP 100(2) which is closest to the exit 50. It should be understood that the terms "location" or "RF location" as used herein means location in terms of RF proximity, e.g., receive signal strength information (RSSI) and not necessarily in an absolute {x, y, z} coordinate sense. Thus, when generating a handover trigger, it is not important that the trigger be provided at an exact {x, y, z} coordinate, but instead that it is provided before the MN leaves adequate WLAN radio coverage, for example.

APs 100(3) and 100(4) are designated BAPs because they are located along a border of the building 5 but not necessarily close to an exit. APs 100(5) and 100(6) are configured to be MMAPs because they are located close to handover points, e.g., exits 40 and 50, respectively. Finally, APs 100(7)-100 (11) are IAPs because they are located generally in the interior of the building 5. It should be understood that while FIG. 1 shows APs 100(1)-100(11), there may be numerous additional APs of the various types or roles, but for simplicity additional APs are not shown in FIG. 1.

Figure 2:
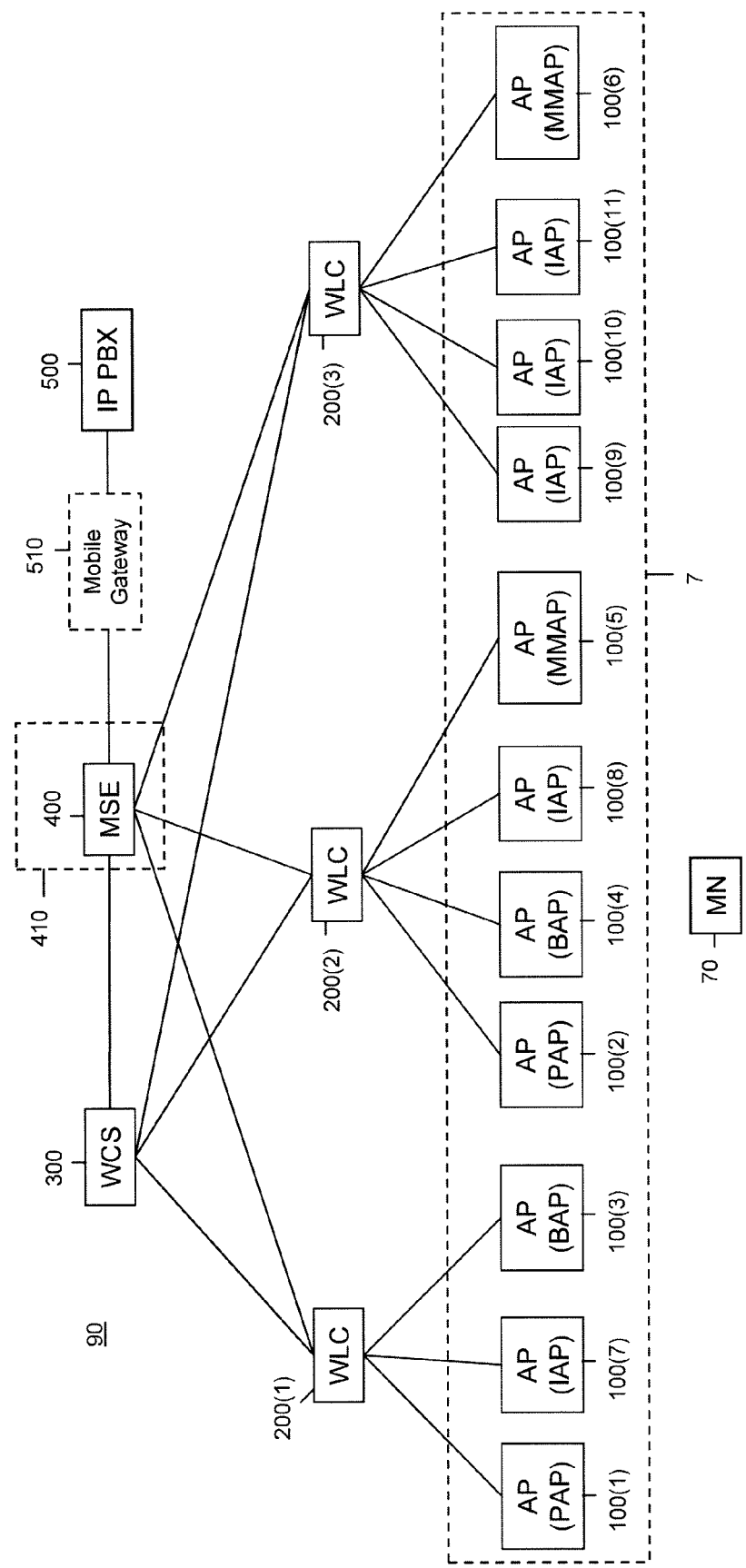
FIG. 2 is a block diagram showing an example of a configuration of the WLAN equipment to provide measurements used for generating a handover trigger.

Turning now to FIG. 2, an example of a WLAN infrastructure system shown generally at reference numeral 90 is now described. In the example of FIG. 2, there are WLAN controllers (WLCs) 200(1), 200(2) and 200(3) that connect to and communicate with multiple APs. The connection between a WLC and its APs is typically wired (e.g., a wired local area network). Each WLC connects to a corresponding group of one or more APs. For example, WLC 200(1) connects to a plurality of APs including APs 100(1), 100(3) and 100(7), WLC 200(2) connects to a plurality of APs including APs 100(3), 100(4), 100(5) and 100(8) and WLC 200(3) connects to a plurality of APs including APs 100(6) and 100(9)-100 (11). Some APs may also be used to make measurements (as a PAP, BAP or IAP) without being connected to a WLC, and thus would be configured to communicate directly with the MSE. Such APs would be "autonomous" in this sense, but still could provide information for making intelligent roaming handover decisions.

Each of the WLCs 200(1) to 200(3) is connected to a wireless control system (WCS) 300 and to a central controller called a mobility services engine (MSE) 400. The MSE 400 is a software process executed by a computer processing apparatus (e.g., a server) shown at 410. Thus, the functions of the MSE 400 may be implemented by computer instructions stored on a computer readable medium that, when executed by a computer/processor, cause the computer/processor to perform the MSE functions described herein. Alternatively, the functions of the MSE may be performed by digital logic in a hardware/firmware form, such as with fixed digital logic gates in one or more application specific integrated circuits (ASICs), or programmable digital logic gates, such as in a field programming gate array (FPGA), or any combination of the two types of hardware/firmware processing forms. In sum, the logic for the MSE functions may be implemented in hardware or software.

The WCS 300 performs higher level network management functions associated with the APs by and through their corresponding WLCs and for the WLCs themselves. For example, a system administrator uses the WCS 300 to configure the operational parameters of the AP's radios. The system administrator also uses the WCS 300 to input the locations of APs on a building's floorplan; both the floorplan and AP locations are provided to the MSE 400 for use in handover service functions. The MSE 400 performs mobile roaming functions associated with MNs that move between the WLAN 7 and the other network 80 and vice versa. To this end, the MSE 400 is configured to connect to an IP PBX device 500. The IP PBX 500 manages VoIP calls in the WLAN and interfaces them with the public service telephone network (PSTN). Alternatively, the MSE 400 may connect to a mobile gateway apparatus 510 which in turn connects to the IP PBX 500. The mobile gateway 510 is commonly used because many IP PBXs do not support the required mobility management functions needed to handover of voice calls between the WiFi network and a cellular network. Autonomous APs may communicate directly with the MSE 400 since they are not configured to communicate with a WLC.

The APs perform link measurements and report them via their respective WLC to the MSE 400. The MSE 400 interprets the measurements and generates handover triggers. A hand-out trigger is a handover trigger associated with the MN leaving the WLAN and continuing with a call in progress via the cellular network. It is important that the MSE 400 send a hand-out trigger at the proper time. When a MN is on a WLAN voice call, handing out the call to another network, e.g., a cellular network, can take up to seven seconds and much longer if it is an international call. This time period begins with call setup signaling to the cellular network to the time the WLAN call media begins flowing over to the new call leg on the cellular network. With a typical user walking speed of 4 feet per second (FPS), a 7 second advance notice for a hand-out trigger translates to a distance of 28 feet. Thus, the MN may still be physically located within the building when the trigger needs to be provided.

Since hand-out triggers are to be generated with 7 second advance notice of a MN leaving a building, measurements need to be reported on time intervals of approximately one second. If they are reported less often, for example every 10 seconds, then the MN user could walk out the door of a building between measurements and the handover trigger would not be generated in time.

In some respects, the WLAN infrastructure is at a disadvantage compared to the MN. The MN can use passive scanning to aid its roaming algorithms, either between APs in a network or between the WLAN network and the cellular network. The MN can do this because all APs in a WiFi WLAN network are continuously transmitting beacons at approximately 100 ms intervals. Passive scanning is a more battery efficient means of scanning because the MN does not have to turn on its transmitter; only its receiver is activated. If a MN were to exclusively use passive scanning when there is no active voice call ("on-hook"), then the WLAN infrastructure would receive very few transmissions on which to make link measurements. Consequently, the WLAN handover system would be challenged to determine the MN's proximity to a doorway and thus whether it may imminently need a handover trigger.

A cost of APs performing and reporting measurements is the sheer volume of measurement data that is sent to the MSE 400. However, it is normally not necessary for every AP in a WLAN deployment to make these measurement reports. This is because in a typical building there are generally a very small number of exits. Therefore, it is only necessary to make these more frequent measurement reports near the exits and not throughout the entire building.

Referring back to FIG. 1, by partitioning APs providing radio coverage in a WLAN into measurement and reporting role subsets, the flow and volume of data can be more targeted and as a result the amount of data to be analyzed is reduced. PAPs are located near (in the RF sense) building exits. For example, an AP near a doorway may actually be on the floor right above the doorway, as is the case with the PAP 100(1) shown in FIG. 1 on the second floor 20. In another example, an AP near a doorway may be located somewhere in the building lobby.

Of all the local mode APs that are configured to assist in providing information for handover decisions, PAPs make measurements at the highest frequency and thus generate the greatest volume of data. For example, PAPs are configured to make RSSI measurements on a channel and report these measurements to the WLAN infrastructure at one second intervals. With most enterprise buildings, there are relatively few exits so that there are relatively few APs that are configured to serve as PAPs. Thus, the number of measurements made at the one second frequency that are sent to the MSE 400 can be reduced substantially compared to the number of measurements if all the APs made and reported them. This reduction means the MSE 400 can handle a much larger number of APs and is more scalable. This value can be passed along to the customer as a capability to handle greater floor space or as a cheaper network appliance (i.e., the appliance on which the MSE function is installed).

PAPs may be configured to perform two link measurements on data frames received from an MN: RSSI measurements and traffic stream measurements (TSMs). A TSM is a measure of packet latency and packet loss associated with a stream of packets communicated with the MN 70 and the WLAN 7. Other measurements are possible as well. In addition, a WLC connected to a PAP provides expedited forwarding to MSE 400 of measurements made by a PAP on received Probe Request frames transmitted by an MN and any frames sent by the MN off-channel while the MN is in a communication session, i.e., on a voice call (e.g., 802.11v Location Track Notification Frames) or other customized frames that the WLAN infrastructure equipment may be configured to trigger the MN to send. These off-channel measurements are explained further hereinafter. A Probe Request frame is a message that is sent by a WLAN client device to be received by one or more APs in order to search for another AP with which to associate in the event that the communication link with the current serving AP for the WLAN client device is weakened due to movement of the client device with respect to the AP, or other conditions.

Some PAPs may not be immediately adjacent to building exits in order to support MNs with less than optimal roaming behavior, i.e., a MN may leave the building without first roaming within the WLAN to the best PAP.

BAPs are not configured to make RSSI measurements on the data frames at the one second frequency. Rather, BAPs are configured to make RSSI measurements on received Probe Requests, similar to PAPs, and any frames sent off-channel while the MN is in a particular communication session, e.g., a voice call. This is a lower measurement and reporting requirement than for PAPs which must make measurements on these ancillary frames with low latency as well as the processing results from TSMs on data frames. BAPs are those APs which are nearby PAPs. As such, they may constitute only 15-20% of the APs in the deployment. BAPs also help in deployments with challenging RF conditions (e.g., large indoor atriums).

The low latency forwarding requirements for Probe Requests and other frames sent off channel applies equally to the WLCs and to the PAPs. An WLC would buffer link measurements performed on each of these frames for a period of time until a plurality of measurements on these frames has been collected. In so doing, it can send one message containing multiple reports to the MSE 400. However, this buffering increases the latency of the measurement. Thus, the low latency reporting requirement necessarily affects the implementation of the PAPs, BAPs and WLCs, and it is a tradeoff between achieving low latency on the measurements and accumulating the measurements for more efficient reporting.

IAPs are APs which are not PAPs or BAPs. There are no additional processing requirements for IAPs. IAPs will send reports on received Probe Request frames and other off-channel frames when a MN enters a building. For example, the MN could first associate to a 2nd floor IAP while the MN is still in parking lot of the building.

Figure 3:
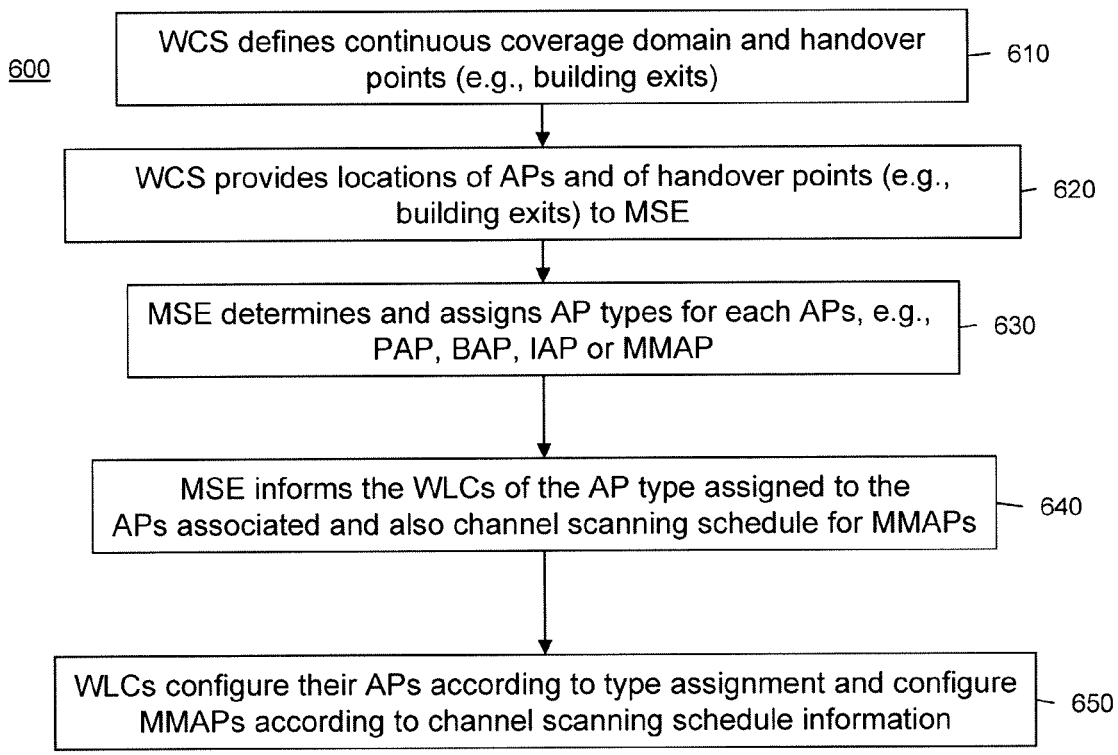
FIG. 3 is an example of a flow chart for a process that configures measurement and reporting roles of access point devices in the WLAN.

Turning now to FIG. 3 with continued reference to FIG. 2, a process 600 is described whereby the APs in a WLAN deployment within a building are configured to achieve the aforementioned measurement and reporting functions. At 610, the WCS 300, based on user inputs such as from a (human) network administrator, defines the coverage domain for the building and the handover points (e.g., building exits). There could be handover points within the building which are not building exits, e.g., there could be a restricted area of a building which does not have WiFi coverage. In this case, a call being serviced by the WiFi network would need to be handed over to the cellular network if the user entered this area. Also, there could be outdoor WiFi coverage, perhaps provided by a mesh network. For example, if a particular network had both indoor and outdoor coverage between buildings, then an MN user could leave the first building, walk across the parking lot and enter the second building without the need to handover the call. All of these different deployment scenarios can be addressed by the network administrator marking handover points on a coverage domain or network plan.

At 620, the WCS 300 has a floor (or site) plan with (x, y, z) locations of the APs and locations for the handover points and provides this data to the MSE 400. At 630, using the information provided by the WCS 300, the MSE 400 algorithmically determines AP measurement and reporting role {MMAP, PAP, BAP, IAP} for each of the APs or the WCS 300 may manually determine the measurement and reporting roles of APs based on input from a (human) network administrator. The WCS 300 may be configured to override the AP role assignment determined by MSE 400. Once the WCS 300 and/or MSE 400 determine AP type for each AP in the WLAN 7, this information is pushed to the WLCs at 640 and in turn to APs at 650. The MSE 400 notifies autonomous APs directly since such APs are not associated with an WLC.

More specifically, at 630, the MSE 400 or WCS 300 determines and assigns measurement and reporting roles for each AP based on their RF proximity with respect to the handover points and other locations in the building. As explained above, RF proximity of an AP with respect to a handover point may not be the same as the actual physical proximity of the AP. Sometimes an AP may receive signals more strongly from a particular point in the building but may not be the AP that is closest in physical distance to that point.

The MSE 400 re-determines AP type whenever there is an AP failure or an AP becomes inoperable. When one or more APs fail, there is potential negative impact to handover trigger generation. This is especially true if a failed AP is an MMAP or a PAP and to a lesser degree a BAP. In this case, some of the measurements which are needed by the MSE 400 in order to generate a handover trigger will not be available. As such, when users are leaving the building, their MN may not receive a handover trigger thus causing any active call to be dropped (when the user is out of radio range of the WiFi network). When an MMAP or PAP fails, it may also necessitate a temporary change to the location of the handover point. The MSE takes into account these failures and also re-calculates a location of a handover point and/or changes the measurement and reporting role assignment of one or more other APs when required.

At 640, the MSE 400 informs the WLCs 200(1)-200(3) of the AP measurement and reporting role assigned to each of its associated APs, either MMAPs or local mode APs, i.e., PAPs, BAPs or IAPs. In addition, for any MMAPs, the MSE 400 informs the corresponding WLC of the channel scanning schedule.

At 650, the WLCs 200(1)-200(3) send messages to their associated local mode APs to configure them according to role assignment and also sends messages to MMAPs to configure them with channel scanning schedule information.

Referring back to FIG. 2, there is a LAN switch (not shown) between a WLC 200(i) and its associated APs. There are multiple APs connected to the LAN switch and there may also be multiple LAN switches arranged hierarchically, e.g., edge layer, distribution layer, core layer. If the LAN switch fails, then several APs become unavailable as their measurements are blocked by the failed switch from reaching their WLC. In more severe cases, this could block AP measurements in a large portion of the floor of a building or perhaps an entire floor from reaching the MSE 400. If too many APs are blocked this way, the MSE 400 may be configured to autonomously decide whether or not handover service can be continued with dynamically adjusted handover points and dynamically adjusted AP types or whether the handover service needs to be set to an operationally "down" state (i.e., handover service cannot be provided for the building until the failed switch is repaired). In a hierarchical arrangement of LAN switches, there is usually built-in redundancy so that the LAN connection to APs can remain fully operational, albeit at some decrease in capacity, despite a failure in a distribution or core level switch.

Figure 4:
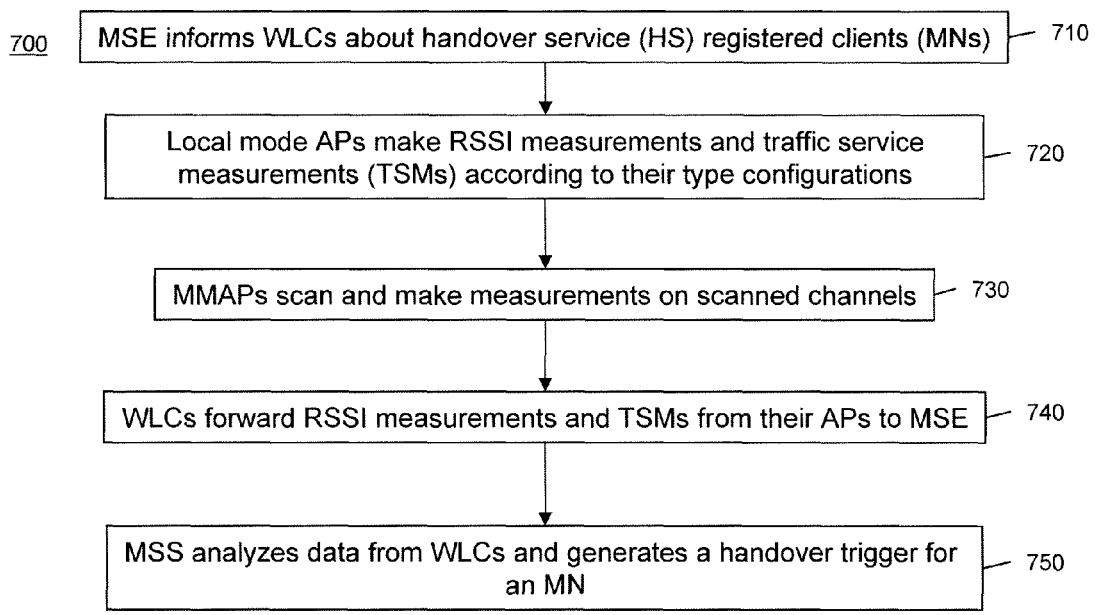
FIG. 4 is an example of a flow chart for a process that collects measurement data from the WLAN equipment to generate handover triggers.

Turning now to FIG. 4, again in conjunction with FIG. 2, a handover data collection process 700 is described. At 710, the MSE 400 informs the WLCs 200(1)-200(3) about those MNs that have registered for handover service. Not all WLAN client devices have dual-mode capability. Therefore, the MSE 400 is only concerned about those WLAN clients that have dual-mode capability and thus could roam between the WLAN and the other network. As explained above, such dual-mode devices are referred to herein as MNs. The MSE 400 is thus configured to register existence of dual-mode wireless client devices that may require handover to/from the another network, and to send messages to the WLCs as to the identity, e.g. a media access control (MAC) address, of registered dual-mode wireless client devices. At 720, local mode APs, according to their role assignment (PAP, BAP or IAP), make RSSI measurements and TSMs on data frames received from MNs. Thus, APs will make measurements only on signals associated with registered MNs, and not for other WLAN client devices which do not roam between the WLAN and the other network. The APs will also forward Probe Request frames received from an MN and any other off-channel frames received from an MN.

At 730, the MMAPs scan and make measurements on a plurality of RF channels according to their configured channel scanning schedule in order to measure receive signal strength of signals on each of the RF channels for a period of time (dwell interval). The channel scanning schedule determines which RF channels to scan as well as the duration of time to spend (i.e., dwell) on each channel. In general, the channel scanning schedule may be different for each MMAP. In the 2.4-GHz band, there are up to 14 channels to scan depending on the regulatory domain, although typically just 3 or 4 channels are commonly used. In the 5-GHz band, there are up to 24 channels to scan depending on the regulatory domain. For example, a channel scanning schedule for the 2.4-GHz band would be to scan the 3 or 4 channels commonly in use. A common channel scanning schedule for the 5-GHz band would be to scan the 4-8 channels used by the APs which are in RF proximity of the MMAP (i.e., the MMAP's neighbor APs).

At 740, the WLCs 200(1)-200(3) forward RSSI measurements and TSMs from their associated APs (PAPs, BAPs and MMAPs) to the MSE 400. At 750, the MSE 400 analyzes data forwarded from the WLCs 200(1)-200(3) to generate a handover trigger for a MN when the reported measurement and other data indicates that the situation is ripe for such a trigger, i.e., that the MN is truly about to leave the building during a communication session involving the MN. The MSE 400 may send the handover trigger to the MN itself, or to gateway equipment, such as the mobile gateway 510 or directly to the IP-PBX 500, to initiate the handover.

As explained above, PAPs perform two link measurements on data frames: RSSI measurements of signals and TSMs associated with traffic signals received from MNs. Other measurements are possible as well.

The MSE 400 may use TSMs as a secondary metric for a handover trigger. A TSM measures packet latency and packet loss. These are excellent indications of when a link quality is poor or becoming poor, indicating that a MN may be experiencing very poor VoIP call quality. In general, statistics for TSMs that indicate a high degree of packet latency or loss (greater than a threshold) may trigger a handover event to improve audio quality for an MN user. PAPs and BAPs make TSMs and generate TSM reports that are sent to MSE 400 via their associated WLC only for MNs. Moreover, the TSM report may be sent to the MSE 400 only when a TSM metrics threshold is exceeded in order to avoid inundating the MSE 400 with data.

Measurements made at 720 may be unique depending on the AP making the measurement. For example, while on a VoIP call, a MN is typically transmitting voice packets at a 50 packets per second (pps) rate. All APs operating on the same channel as the MN and within its radio range can make measurements from reception of these voice packets. The serving AP (the one to which the MN is associated during a VoIP call) usually has the highest quality measurements. Thus, the serving AP can make measurements on all the VoIP data frames and average the data to reduce the statistical variation of the measurements. RSSI measurement variation is caused by multipath in the radio environment as well as by imperfections in the measuring hardware of an AP and imperfections in the transmitter hardware of the MN. As such, the handover triggers can be made more robust using averaged RSSI measurements.

Another big advantage to making RSSI measurements on the 50 pps voice packets is that there is no further burden placed on the MN because the MN needs to transmit these packets to communicate on the VoIP call to the other party anyway. In one embodiment, an exponential averager is employed to perform these measurements in a computationally efficient manner. The following equation is an example of a computation useful for exponentially averaging the RSSI measurements: $Averaged\_RSSI\_dBm(k)=a*RSSI\_dBm(k)+(1-a)*Averaged\_RSSI\_dBm(k-1)$, where k is a time index and a is an averaging constant. Selection of the averaging constant a is dependent on the degree of time variation of the multipath and the rate at which k is advancing, but typical values for a can be $\frac{1}{8}<=a<=\frac{1}{4}$. The Averaged_RSSI is reported to the MSE 40 on a one-second interval basis as described above. The time index is advancing at a 20 ms rate in accordance with the voice coder-decoder (codec) packetization interval in the MN. Voice codecs use other packetization intervals as well, such as 10 ms, 30 ms or 40 ms. The techniques described herein can work with a variety of packetization intervals or even with bursty transmissions (i.e., non isochronous) from a device accessing data services (e.g., email).

The 50 pps measurement rate corresponds to the VoIP codec rate for real-time (RT) voice frames. In addition, the MN may be transmitting other frames (e.g., when downloading or uploading email). The APs may include these other non-RT frames in the exponential average as well. This provides additional averaging and thus additional resilience to multipath fading.

The APs can distinguish between the transmission of RT frames used for VoIP and non-RT frames used for data services by examining the user priority (UP) field in the 802.11 MAC header. In a WiFi network, RT frames use a UP value of 5 or 6 (video and voice, respectively) and non-RT frames use any of the other 6 priority levels (there are 8 total priority levels). By monitoring the UP value in received frames, the AP can determine whether a voice call is in progress. For example, when the AP has not received any frames having UP=6 for several seconds (e.g., 15 seconds), then it can reasonably conclude there is no VoIP call in progress. This is an important state for the WLAN infrastructure to maintain— that is, whether the MN is on-call or on-hook. When the MN is on-hook, there is no possibility of dropping a call should the user leave the building. Thus, it is less important for the WLAN infrastructure to closely track the MN's location and the WLAN infrastructure does not need to request any additional frames (or at least a very small number of additional frames) to be transmitted by the MN. Therefore, the MN's battery energy is conserved.

When one or more link parameters between a MN and an AP cross a threshold (e.g., the RSSI of frames received from its serving AP becomes too low) a MN must roam to a new AP or risk dropping the link. In WiFi networks, a MN tunes off-channel to transmit Probe Request frames and listens for Probe Response frames from other APs. A MN uses the Probe Responses to determine the AP to associate with next. While this is occurring, the APs receiving the Probe Request frames can process these frames to aid in the handover process. The APs may be configured to directly forward these Probe Request frames to the MSE 400 as described above. If an AP receives multiple Probe Request frames in a sufficiently short time interval, they can be averaged to reduce the statistical variation of the measurement. Then, the results of the probe request measurements can be forwarded to the MSE 400 to aid in handover trigger generation. Since APs other than the serving AP are receiving these frames, the measurements can be used by an RF triangulation algorithm (or similar algorithm such as RF fingerprinting) to aid in determining the location of the MN with respect to a handover point, e.g., a building doorway. Numerous techniques for determining the location of the MN using such measurements are known in the art and are therefore not described here. The point is that the information be made available to the MSE 400 with low latency. If the AP (or WLC) were to buffer this information too long, it would not be useful in generating a handover trigger. For example, an AP may want to perform averaging or it may want to aggregate the processing results of many Probe Request frames in order to reduce the rate at which packets are provided to the WLAN infrastructure thereby reducing its processing burden. Frame types other than Probe Request frames may be useful for handover processing. Other examples are the Link Measurement Request and Response frames introduced by the IEEE 802.11k-2008 communication standard.

When a MN is using a passive scanning mode to search for another AP to roam to, then APs will not be receiving Probe Request frames from the MN because the MN will not be transmitting them. Without these frames (or other suitable frames), the AP will not be able to accurately determine the location of the MN. When the MN is off-hook (that is, on a voice call), the APs may be configured to request the MN to transmit suitable frames off-channel. The AP could accomplish this by requesting the MN to perform an 802.11k or vendor-customized Beacon report or a path loss measurement. In response, the MN transmits off-channel frames and will expend battery power in so doing. If these requests are made too often, the MN's battery will drain too quickly. As described above, the WLAN infrastructure keeps track of the MN's call state and only need request these additional frames when the MN is on a voice call and about to leave the building.

In order to further reduce the need for the MN to transmit additional frames, the WLAN infrastructure keeps track of the MN's location within the building. If the MN is not near a handover point, e.g., a building exit, then the additional frames are not required and will not be requested, or they may be requested much less frequently. Again, location, as used herein, can be different than an {x, y, z} coordinate; it can be expressed as an RF proximity to a handover point.

Figure 5:
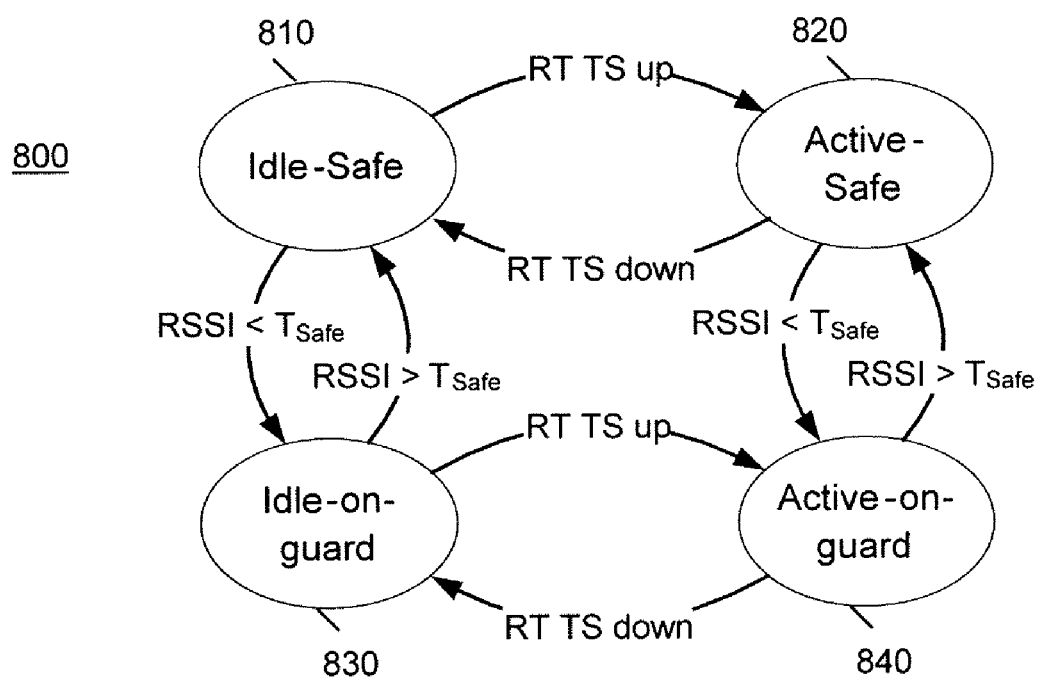
FIG. 5 is a diagram of a state machine useful in a WLAN controller to track the state of a dual-mode wireless client device.

Referring now to FIG. 5, a state machine process 800 is shown whereby the WLCs 200(1)-200(3) or the MSE 400 keeps track of the state of MNs in order to determine when additional frames are needed from the MN for handover related trigger assessment. In an alternative implementation, the MSE uses this state machine process to keep track of the MN's state. This state machine process 800 is designed to conserve battery energy in the MN and to conserve WLAN processing resources when handover is not imminent. There are four RSSI states for MNs: idle-safe 810, active-safe 820, idle-on-guard 830, and active-on-guard 840. An MN is "idle" if there have been no RT transmissions (UP=5 or 6) in the last 15 seconds or some other configurable period of time. An MN is "active" when it is not idle. An MN is "safe" when the RSSI measured on signals from that MN is above a safe threshold Tsafe such that handover is not imminent. An MN is "on-guard" when it is not "safe", that is when the RSSI measured on signals from that MN is below the safe threshold Tsafe and handover is potentially imminent.

In active states, the RSSI measurements of the MN's VoIP frames and the RSSI of any Probe Request frames sent by the MN are analyzed. If these measurements are from APs in the RF proximity of a handover point and below the safe threshold Tsafe, requests for off-channel transmissions are made to the MN. That is, when the receive signal strength of the voice call signals are less than a threshold, the WLC generates a message that it sends via the serving AP of the MN, requesting the MN to transmit a signal (e.g., Probe Request frame) on a different channel than that is in use for the VoIP call, to allow one or more APs to make measurements on the off-channel transmission by the MN. This is so that the MSE 400 can determine whether the RSSI of those signals at APs in the vicinity of the MN, when compared to a threshold vector, and therefore should generate a handover trigger. A threshold vector is a set of thresholds corresponding to a set of APs that are in the RF proximity of a handover point. In idle states, the RSSI measurements on Probe Request frames or other off-channel transmissions are analyzed. If these measurements are too stale or are below the safe threshold, then the WLC or MSE 400 sends a command to the appropriate APs to request the MN to make off-channel transmissions to enable further measurements or to forward those transmissions to the MSE 400.

Thus, to summarize the state machine process of FIG. 5, the WLCs are configured to track a state of dual-mode wireless client devices (i.e., MNs) based on data supplied by their corresponding group of APs. The data indicates whether the MN is transmitting voice call signals and also the RSSI at the group of APs of the voice call signals. The WLCs are configured to assign one of a plurality of states to the MN depending on the presence of the voice call signals and the RSSI of the voice call signals. The WLCs are further configured to determine when the RSSI of the voice call signals are less than a threshold in order to send a message to the MN requesting it to transmit a signal on a different RF channel than that used for the voice call to enable one or more APs to make measurements of the signal on the different RF channel.

According to a further aspect, the WLAN infrastructure can use signaling packets to determine when an MN is placing a voice call or receiving a call. If the WLCs 200(1)-200(3) contain a session initiation protocol (SIP) proxy, the signaling for a voice call can be momentarily "held up" to prevent the call from being placed. Then, the WLAN infrastructure can quickly determine the location of the MN. Most of the time the MN will be inside the building; if so, then the SIP proxy quickly forwards the signaling to the intended SIP agent so that the call will be placed. In a small number of cases, the MN user will have just walked outside (or is in the process of walking outside), but has not left WLAN radio coverage. If the call were to be put through on the WLAN, the user would likely experience a few seconds of poor audio while the call is handed over to the other network, e.g., cellular network. However, by first determining where the MN is located, the potential for poor audio can be diminished or avoided altogether (i.e., the call would be placed directly over the cellular network from the outset). With this operation, the WLAN infrastructure does not need to periodically request any special frames to be transmitted by the MN to keep track of the MN's location and in so doing conserves the MN's battery energy. In this latter case, the WLAN infrastructure will quickly send a hand-out trigger to the MN; additionally, the SIP proxy does not forward the signaling.

In a variation, when the WLAN infrastructure "snoops" on the signaling packet, it can initiate a location update in parallel with the call being placed. The same steps are followed. If the MN's location can be determined quickly enough and the MN is located in a poor WLAN coverage area (e.g., the user just left the building), then the handover to another network, e.g., cellular network, can commence before the WLAN coverage degrades too much.

MMAP Operation

As explained above in conjunction with FIGS. 1 and 2, MMAP operation is when an AP's radio scans channels in the operating band according to a channel scanning schedule. The channel scanning schedule determines the order and selection of channels to monitor as well as the dwell time for each channel. The dwell time is the time duration over which the MMAP will perform link measurements before tuning to the next channel. The channel schedule can either be determined a priori (i.e., according to a static configuration) or dynamically.

Unlike local mode APs that have associated client devices, MMAPs typically do not have any associated WLAN clients. In order for MMAPs to make measurements to assist with handover decisions, the channel scanning schedule is first determined. The MSE may also inform the MMAP for which client devices to make measurements. For dual-mode VoIP service, the client devices which the MMAP will monitor are the dual-mode devices, i.e., MNs. Alternatively, the WLAN infrastructure does not inform the MMAP which client devices it should monitor and in this situation, the MMAP performs link measurements for all devices in its radio range.

Again, the channel scanning schedule may be described by several parameters:

Minimum channel dwell time. This is the time duration to monitor a channel before moving to the next channel (including time needed to switch channels).

Channel list. This is the list of channels that a MMAP monitors.

Re-visit interval. This is the time duration between two successive dwells for the same channel.

Channel bandwidth. This is the bandwidth of a channel dwell and is, for example, 20 MHz or 40 MHz.

Since an MN may not be associated to the best PAP when the MN leaves a building, the MMAP scans the channels used by the three or four nearest (in an RF sense) APs to detect transmission from an MN that is off-hook, i.e., on a VoIP call. The MMAP measures RSSI, computes an average RSSI and reports this to MSE 400 on relatively frequent basis, e.g., one-second intervals, so that the MSE can generate a handover trigger.

In one example, the re-visit interval is up to one second such that all channels in the channel list are scanned in this interval. For example, the channel dwell time is in the 150 ms to 250 ms range.

When an MN registers for handover service, the MSE 400 commands the MMAPs as to which client devices to monitor. Dual-mode wireless client devices, i.e., MNs, are typically identified by their MAC address. The benefit of this is that it mitigates a potential denial of service (DoS) attack. Consider the case when an MMAP monitors all the client devices (as described above) or decides for itself which client devices to monitor. In this case, a malicious client device which dynamically changes its MAC address can cause all the processing resources (e.g., memory) allocated for handover processing to be consumed. This is a form of a DoS attack.

When the MSE informs the MMAPs as to which MAC addresses to monitor, the MSE knows which MNs are bona-fide since it authenticates them prior to authorizing them to receive handover service. Because the MMAPs only are commanded to process bona-fide MNs, the potential DoS attack is mitigated.

Link measurements performed by the MMAP may include, but are not limited to, RSSI measurements and TSMs. Some measurements performed on local mode APs may not have an exact analogous implementation on MMAPs. For example, a local mode AP can start a timer when a frame placed in one of its transmit queues and stop a timer when the frame is successfully transmitted. Since the MMAP does not bridge any frames to client devices, it cannot know when the frame is placed in queue for transmission. Nonetheless, the MMAP can observe fields in the 802.11 MAC header such as the sequence number and retry bit, and compute valuable link measurements related to frame loss and latency, two of the principle metrics constituting TSMs.

The MMAP provides the most benefit when a VoIP call or other communication session application for which continuity is beneficial or desired, is active for a particular MN. When a VoIP call is active, the MN is transmitting a voice frame every 20 ms or at a 50 pps rate. Thus, an MMAP has the opportunity to measure RSSI at a 50 pps rate. Depending on the dwell time, which is determined by the channel scanning schedule, the MMAP can perform a significant amount of averaging on the RSSI data. This averaging mitigates (reduces) RSSI measurement variation caused by multipath in the radio environment. As such, the handover triggers can be made more robust.

MMAPs also receive and forward Probe Request frames or other off-channel transmissions made by an MN. The WLC forwards these measurements to the MSE. These measurements are useful for the MSE to determine when to generate a hand-in trigger.

There are several benefits to the use of the MMAP. The first benefit is that the MMAP provides measurements which can be used to generate very robust handover triggers. Since optimally an MMAP is located near a building exit, the MMAP serves as a building exit proximity detector since its RSSI measurements have a strong signature when a MN on an active VoIP call walks nearby or underneath the MMAP.

The MMAP acts as a proximity detector regardless of the channel on which the MN is operating (i.e., because the MMAP is scanning all the operating channels). The MMAP, as a proximity detector located near a building doorway, can easily detect when a MN user walks toward the doorway and can provide a handover trigger with the required 7 second advance notice.

The second benefit is that the MMAP works robustly independently of the MN's roaming algorithm. For example, consider a so-called "sticky-roaming" client. Clients exhibiting this behavior remain associated to a first AP even when the user moves to another AP having a stronger signal than that of the first AP. In this situation, it is instructive to consider how the WLAN infrastructure would generate the handover trigger without the use of MMAPs. In order to determine when the MN user is approaching one of the building exits, RSSI measurements need to be made by three or more APs. Since the MN can only be associated to one AP at a time, only one of the APs is typically measuring the RSSI of VoIP data frames. Other APs operating on the same channel will also receive these data frames, but their lower MAC function (when not operating in a so-called "promiscuous mode") will drop them because they have a different basic service set identifier (BSSID). Promiscuous mode is an operation mode of an AP that allows an AP to receive and process received signals without lower MAC filtering them based on BSSID. The other two (or more) APs measure another frame type destined to a broadcast MAC destination address that is routinely transmitted by client devices. This frame type is typically a Probe Request frame transmitted to a wildcard BSSID. However, RSSI measurements on Probe Requests frames are fraught with uncertainty due to the unknown transmitter power and the so-called "wrong channel problem" described hereinafter.

Thus, as an alternative to using an MMAP positioned near a handover point, another technique is to have 3 or more APs in proximity to the handover point configured to operate on the same RF channel and in promiscuous mode. In this way, the 3 or more APs can perform RSSI averaging on signals received on the same RF channel thereby producing robust measurements to support location triangulation in order to confirm whether a MN is close to a handover point for the MSE's handover algorithms. After performing the RSSI averaging, frames not matching the AP's BSSID are discarded so that duplicate frames (i.e., those from the non-serving APs) are not forwarded into the local area network.

In order to estimate where a client device is located with respect to several APs, the APs need to estimate the RF path loss with respect to the client device. Assuming omni-directional antennas at the AP and client device, the path loss can be approximated by the formula: Path Loss (PL)=Client's transmitter power minus RSSI measured at the AP. Unfortunately, prior to the IEEE 802.11k amendment, there was no standardized way for a client to inform the AP of its transmitter power; because of this, the AP must assume a transmitter power. To the degree this assumption is incorrect, the location will be in error. Moreover, the RSSI measurements are made on a signal transmitted through a channel having time-varying multipath. This introduces an additional measurement error. By averaging over a number of measurements, the error can be reduced; however, this is not possible with Probe Request frames since a MN does not transmit very many of them.

The so-called "wrong channel" problem is most prevalent in the 2.4 GHz band, when direct sequence spread spectrum or complementary code keying modulation is employed. The wrong channel problem occurs when an AP receives a Probe Request frame transmitted by a client device operating on a different channel than the AP. In this situation, the AP will correctly demodulate the Probe Request frame. However the RSSI measurement on that frame will be grossly in error. The larger the difference in operating frequency between the AP and client, the larger the measurement error. Errors up to 40 dB have been observed in practice. This situation may easily be resolved if the channel number on which the Probe Request frame was transmitted was encoded somewhere within the frame.

To summarize, RSSI measurements of a client device's frames need to be made at three or more APs in order to properly locate the client device. However, only one AP can make robust RSSI measurements on data frames and the other APs make inherently error-prone measurements on Probe Request frames.

Given this background, consider again the situation where the user of a sticky-roaming MN is leaving the building. The MN remains associated to an AP in the interior of the building even though there may be an AP located near the doorway. As the MN is moving towards the doorway, the AP to which the MN is associated will be reporting low RSSI values and other APs will be reporting error-prone RSSI values from Probe Request frames transmitted by the MN. To be safe, a handover trigger needs to be generated (due to the need to provide 7 second advance notice requirement). However, in many cases, the user will not actually be leaving the building. The user may just be walking and remaining in the interior of the building but will get a handover trigger nonetheless. This leads to poor handover performance and unsatisfied customers.

On the other hand, the MMAP is scanning all the channels in the frequency band being used by neighbor APs. The MMAP will still detect that the user is leaving the building. Moreover, depending on the channel schedule, the MMAPs can perform significant RSSI averaging to make handover triggers more robust.

There are deployment scenarios in which the MMAP functioning as a proximity detector as described above may not work as well as desired. Below are listed several example scenarios and further system variations provided to re-gain desirable handover performance in those scenarios.

1. Due to reasons of aesthetics or building construction, the MMAP cannot be located next to a handover point, e.g., a building exit, but it can be positioned nearby. For example, consider the situation when an MMAP has to be mounted 15 feet to the left of an exit door. When an MN user is exiting the building from the left of the exit, the system will properly generate handover triggers. However, when the MN user is exiting the building from the right of the exit door, the MN may not get close enough to the MMAP to enable the MMAP to detect the MN and thus supply measurements to the MSE to cause a handover trigger to be generated. To mitigate this situation, measurements from local mode APs (e.g., PAPs, BAPs and IAPs) are combined with measurements from MMAPs to generate the handover trigger. Additionally, when an MN comes close to the MMAP (but not near enough to cause a handover trigger to be generated), the local mode AP to which the MN is associated (serving AP) requests a Beacon report from the MN.

With reference to FIG. 6, this Beacon report request process 900 is further described. The Beacon report request is essentially a request to the MN to transmit a Probe Request frame on each channel which is a member of a set of RF channels (off-channel transmissions). At 910, the MSE 400 generates a message that instructs the serving AP for the MN to generate and send a Beacon report. More specifically, the MSE sends the request message to the appropriate WLC and then that WLC formulates the message request that is sent via the serving AP to the MN. The message from the MSE 400 reaches the WLC for the serving AP and at 920, the serving AP transmits a unicast Beacon report request to the MN. At 930, the MN receives the Beacon report request and in response sends a first message (e.g., a Probe Request frame) on each of multiple RF channels on which other local mode APs may be operating. The APs on these other RF channels, upon receiving the Probe Request frame from the MN, transmit second messages (e.g., Probe Response frames). The MN receives and measures the RSSI of the Probe Response (or alternatively Beacon) frames transmitted from APs operating on those RF channels. Meanwhile, at 940, the APs that receive the Probe Request frames transmitted by the MN measure the RSSI of the received Probe Request frames and send measurement reports, together with the Probe Request frames themselves, to their corresponding WLCs. The WLCs then forward the RSSI measurements made by the APs on the received Probe Request frames (without the Probe Request frames) to the MSE.

At 950, the MN aggregates those RSSI measurements made on received Probe Responses into a single measurement message (a Beacon report) that it transmits to its serving AP for forwarding via a WLC to the MSE 400. The MN's behavior in this regard is the same whether its serving AP is a unified AP (connected to a WLC) or is an autonomous AP. The serving AP in turn forwards the Beacon report to the MSE, either through a WLC or directly to the MSE. At 960, the MSE 400 analyzes the measurements made by the APs on the Probe Requests transmitted by the MN and the RSSI measurements in the Beacon report sent by the MN to determine when it is time to generate a handover trigger. The benefits of the process 900 are as follows. First, it causes the MN to transmit frames which, upon reception by multiple APs at known locations, can be used to determine the location of the MN. Second, the MSE 400 may use the Beacon report to estimate path loss between an AP and the MN, and thus determine the appropriate time to generate a handover trigger. While the terms "Probe Request", "Probe Response" and "Beacon" are used in connection with the description of FIG. 6, this is not meant to be limiting. In general, the Probe Request frame is a first message of any type and the Probe Response frame is a second message of any type. Likewise, the Beacon report may be a report of any type. For example, there may be similar messages that are part of a WLAN communication standard that are designed to achieve or perform similar functions as the Probe Request frames, Probe Response frames and Beacon reports, but these other similar messages may use different names and formats, such as location messages that are part of the IEEE 802.11v standard or customized messages that a vendor of WLAN equipment may provide.

2. The building exit is very wide. For example, the building is an auditorium with many doors at the lobby entrance. In this situation two MMAPs are located next to the building exits, one to the right and the other to the left. If measurements from either of them indicate an MN user is in close proximity, a handover trigger is generated.

3. The building exit is very tall. For example, the building is an aircraft hangar or a manufacturing facility. In this situation, directional antennas can be used. They would be mounted overhead and facing down.

One advantage of the AP role assignment described herein is that it lowers the number of link measurements presented to one or more central devices which are responsible for interpreting these measurements to generate handover triggers. Because of the reduced, albeit sufficient, number of link measurements, the hardware on which the handover trigger processing is hosted can scale to handle larger networks that would otherwise be possible. Alternatively, the handover processing could be hosted on a less expensive hardware appliance. In either situation, customers derive the benefit of a more cost effective handover solution.

Another advantage is that the MN's battery energy is conserved while tracking the MN's location, even if the MN employs passive scanning. Conservation of battery energy is a key metric for customers who desire long standby/talk times. The more the MN employs passive scanning, the fewer frames the infrastructure receives (to make link measurements) and the more frequently it must request the MN to transmit frames.

Still another advantage is that robust handover triggers can be generated by the WLAN infrastructure without any dependency on the MN. Since system administrators often need to provide the enterprise's employees a choice of mobile phones, handover behavior needs to be consistent across different handsets models and handset manufacturers. WiFi infrastructure-based measurements and control assures this reliability and consistency, reducing time to resolve user's complaints. In addition, configuration of the location of network handover points and the associated link measurement thresholds used by the MSE to generate handover triggers can be tuned, if needed, for each building to yield consistent, reliable handover behavior.

This solution scales to systems that use many different vendors of handset equipment since there is very little additional functions imposed on the handset.

Still another advantage is that better handover triggers can be generated even if the dual-mode wireless client device has a poor or sub-optimal roaming algorithm. Since a wireless client device can be associated with any AP (and not necessarily with an AP adjacent to the building's doorway) when it should roam to another network, e.g., a cellular network, an MMAP can still monitor for proximity of the MN to the doorway and provide information to the MSE 400 to enable it to generate a properly-timed handover trigger. Another advantage is that MMAPs can perform substantial averaging of RSSI measurements which enables handover triggers to be made more robust.

While the foregoing description makes reference to devices that can roam between a WiFi WLAN and a cellular network, this is meant by way of example only. For example, the techniques described herein may be useful for devices that roam between first and second different WiFi WLANs (administered by different entities), or between a WLAN and other types of wireless networks, such as a WiMAX™ network and a cellular network, etc.

Additionally, many of the techniques and system configurations described herein for a hand-out from a WiFi WLAN to another network, e.g., a cellular network, may be applied to a hand-in from another network to the WiFi WLAN. Also the measurements described above for handover (hand-in and hand-out) may be useful when there is no call or other communication session in progress (i.e., the MN is in idle state). It may not be as important when there is no in-progress communication application, but it can nevertheless be used for such purposes.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A system comprising:
a plurality of wireless local area network access points configured to provide wireless communication in a first wireless network with wireless client devices including dual-mode wireless client devices that are configured to communicate with the first wireless local area network and with at least one other network; and
a central controller configured to communicate with the access points, wherein the central controller is configured to receive information defining a coverage domain that is associated with the plurality of access points, information related to locations of at least one handover point where a dual-mode wireless client device may roam between the first wireless local area network and the other network during a communication session, and information about locations of the plurality of access points, wherein the central controller is configured to assign a plurality of different types of measurement and reporting roles to the plurality of access points based on their radio frequency locations with respect to the handover points, the access points which are assigned different types of measurement and reporting roles providing information that is utilized by the central controller to determine a location of at least one wireless client device in relation to a handover point, and at least one access point assigned one type of measurement and reporting role that provides information at a greater frequency than at least one other access point that provides information based upon another assigned type of measurement and reporting role.

2. The system of claim 1, wherein the central controller is configured to assign a first measurement and reporting role to those access point devices that are closest in radio frequency location to a handover point, and wherein the central controller is configured to assign a second measurement and reporting role to those access points that are proximate borders of the coverage area.

3. The system of claim 2, wherein access point devices assigned to the first measurement and reporting role are configured to make receive signal strength measurements of signals received from the dual-mode wireless client devices during the communication session and to make packet loss and packet latency measurements associated with packets transmitted between the dual-mode wireless client device and the first wireless local area network during the communication session.

4. The system of claim 3, and wherein access point devices assigned to the first and second measurement and reporting roles are further configured to make receive signal strength measurements on request messages transmitted by the dual-mode wireless client device when it attempts to associate with a different access point.

5. The system of claim 1, wherein one or more of the plurality of access point devices that have a radio frequency location near a handover point are configured to operate in a monitoring mode and to scan a plurality of radio frequency channels in order to measure receive signal strength of signals, including signals transmitted by the dual-mode wireless client device, on each of the radio frequency channels for a period of time.

6. The system of claim 1, wherein the central controller is configured to register existence of a dual-mode wireless client device which may require handover to the other network, and to send messages to the wireless controllers as to an identity of the dual-mode wireless client device.

7. The system of claim 6, wherein the central controller configures the access points to make measurements and reports only for a dual-mode wireless client device that has registered with the central controller for handover to the other network.

8. The system of claim 1, wherein the central controller is configured to analyze data contained in reports received from the plurality of access points in order to determine when to generate a handover trigger for the communication session of the dual-mode wireless client device.

9. The system of claim 1, wherein the central controller is configured to track a state of a dual-mode wireless client device based on data that indicates whether the dual-mode wireless client device is transmitting voice call signals and the receive signal strength at access points that receive the voice call signals, and wherein the central controller is configured to assign one of a plurality of states to the dual-mode wireless client device depending on the presence of the voice call signals and the receive signal strength of the voice call signals.

10. The system of claim 9, wherein the central controller is further configured to determine when the receive signal strength of the voice call signals is less than a threshold to send a message to the dual-mode wireless client device requesting it to transmit a signal on at least one different RF channel than that in use for the voice call to allow one or more access point devices to make measurements of the signal on the different RF channel.

11. The system of claim 1, wherein the central controller is further configured to determine when one or more of the plurality of access points becomes inoperable in order re-compute a location of a handover point and/or make changes to the measurement and reporting roles of one or more other access points.

12. The system of claim 1, wherein the central controller is further configured to determine when measurement reports from multiple access points are not reaching the central controller in order to determine whether to discontinue handover service with respect to the dual-mode wireless client device.

13. The system of claim 1, wherein the central controller is further configured to generate a message that is sent to the dual-mode wireless client device via an access point that is in communication with the dual-mode wireless client device to cause the dual-mode wireless client device to transmit a first message on each of different radio frequency channels which upon reception cause access points that are operating on those different radio frequency channels to respond with second messages, and wherein access point devices that receive first messages are configured to measure the receive signal strength thereof and to send measurement reports to the central controller.

14. The system of claim 13, wherein one or more access points are configured to receive from the dual-mode wireless client device a report that contains receive signal strength measurements made by the dual-mode wireless client device on the second messages received by the dual-mode wireless client device on each of the different radio frequency channels, and to forward the report to the central controller.

15. The system of claim 1, wherein the other network is a second wireless local area network.

16. The system of claim 1, wherein the other network is a cellular network.

17. The system of claim 1, wherein three or more of the plurality of access point devices that have a radio frequency location near a handover point are configured to operate on the same radio frequency channel and in a mode that allows reception and processing of received signals without lower media access control filtering in order to measure receive signal strength of signals received on the same radio frequency channel, including signals transmitted by the dual-mode wireless client device.

18. A method comprising:
at a plurality of wireless local area network access points that are part of a first wireless local area network:
receiving signals from dual-mode wireless client devices that are configured to communicate with the first wireless local area network and at least one other network; and
measuring characteristics of signals received from dual-mode wireless client devices according to different types of measurement and reporting roles assigned based on access point location relative to at least one handover point in a coverage area of the first wireless local area network where dual-mode wireless client devices may roam to the other network;
at a controller:
receiving measurement reports from the plurality of access points assigned different types of measurement and reporting roles, wherein at least one access point assigned one type of measurement and reporting role provides information at a greater frequency than at least one other access point that provides information based upon another assigned type of measurement and reporting role; and
analyzing data in the measurement reports to determine whether to generate a handover trigger to enable a dual-mode wireless client device to roam between the first wireless local area network and the other network.

19. The method of claim 18, wherein measuring comprises first measuring characteristics of signals received at one or more first access points that are located relatively close to the at least one handover point, and second measuring characteristics of signals received at one or more second access points that are located near borders of the coverage area.

20. The method of claim 19, wherein first measuring comprises measuring receive signal strength of signals received from a dual-mode wireless client device and measuring packet loss and latency associated with a communication session ongoing between the dual-mode wireless client device and the first wireless local area network.

21. The method of claim 20, wherein first and second measuring comprise measuring receive signal strength measurements on request messages sent by a dual-mode wireless client device when the dual-mode wireless client devices attempts to associate with a different access point.

22. The method of claim 18, and further comprising, at one or more access point that are located near the at least one handover point, scanning each of a plurality of radio frequency channels and measuring receive signal strength of signals, including signals transmitted by a dual-mode wireless client device, on each of the plurality of radio frequency channels for a period of time.

23. The method of claim 18, and further comprising transmitting a message to a dual-mode wireless client device via an access point that is in communication with the dual-mode wireless client device to cause the dual-mode wireless client device to transmit a first message on each of different radio frequency channels, receiving second messages at one or more of the plurality of access points on the different radio frequency channels that are transmitted by access points that receive the first message, and measuring receive signal strength of the second messages at one or more of the plurality of access points and sending measurement reports associated with the first messages to the controller.

24. The method of claim 23, and further comprising receiving at one or more of the plurality of access points from the dual-mode wireless client device a report that contains receive signal strength measurements made by the dual-mode wireless client device of second messages received on each of the different radio frequency channels, and forwarding the report to the controller.

25. A system comprising:
- a plurality of wireless local area network access points configured to provide wireless communication in a first wireless network with wireless client devices including dual-mode wireless client devices that are configured to communicate with the first wireless local area network and with at least one other network, wherein each of the plurality of access points is configured according to one of several different types of measurement and reporting roles to make measurements of signals associated with dual-mode wireless client devices based on RF locations of each access point with respect to at least one handover point where a dual-mode wireless client device may roam between the first wireless local network and the other network; and
- a controller configured to communicate with the access points, wherein the controller is configured to receive and analyze data received from the plurality of access points having different types of measurement and reporting roles in order to determine when to generate a handover trigger for the communication session of the dual-mode wireless client device, wherein at least one access point having one type of measurement and reporting role providing information at a greater frequency than at least one other access point that provides information based upon another type of measurement and reporting role.

26. The system of claim 25, wherein one or more access points that are closest in radio frequency location to a handover point are configured in accordance with a first measurement and reporting role to make measurements of received signals associated with a dual-mode wireless client device and report measurements to the controller, and one or more access points that are proximate borders of the coverage area are configured in accordance with a second measurement and reporting role to make measurements of received signals associated with the dual-mode wireless client device and report measurements to the controller.

27. The system of claim 26, wherein one or more access points that are configured according to the first measurement and reporting role are configured to make receive signal strength measurements of signals received from the dual-mode wireless client device during the communication session and to make packet loss and packet latency measurements associated with the communication session.

28. The system of claim 27, wherein one or more access points that are configured according to the first and second measurement and reporting roles are configured to make receive signal strength measurements on probe request messages transmitted by the dual-mode wireless client device when it attempts to associate with a different access point.

29. The system of claim 25, wherein one or more of the plurality of access points that have a radio frequency location near a handover point are configured to operate in a monitoring mode and to scan a plurality of radio frequency channels in order to measure strength of signals including signals transmitted by the dual-mode wireless client device on each of the radio frequency channels for a period of time.

30. The system of claim 25, wherein the controller is further configured to generate a message that it sends to the dual-mode wireless client device via an access point that is in communication with the dual-mode wireless client device to cause the dual-mode wireless client device to transmit a first message on each of different radio frequency channels which upon reception cause access points that are operating on those different radio frequency channels to respond with second messages, and wherein access point devices that receive the first message are configured to measure the receive signal strength of the second message and to send measurement reports to the controller.

31. The system of claim 30, wherein one or more access points are configured to receive from the dual-mode wireless client device a report that contains receive signal strength measurements made by the dual-mode wireless client device on the second messages received by the dual-mode wireless client device on each of the different radio frequency channels, and to forward the report to the controller.

32. The system of claim 25, wherein the other network is a second wireless local area network.

33. The system of claim 25, wherein the other network is a cellular network.

* * * * *